United States Patent
Kaneko et al.

(10) Patent No.: US 12,362,378 B2
(45) Date of Patent: Jul. 15, 2025

(54) NONAQUEOUS ELECTROLYTE SECONDARY BATTERY

(71) Applicant: SANYO Electric Co., Ltd., Kadoma (JP)

(72) Inventors: Ken Kaneko, Hyogo (JP); Yuu Takanashi, Hyogo (JP); Kentaro Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 521 days.

(21) Appl. No.: 17/910,974

(22) PCT Filed: Feb. 8, 2021

(86) PCT No.: PCT/JP2021/004631
§ 371 (c)(1),
(2) Date: Sep. 12, 2022

(87) PCT Pub. No.: WO2021/186949
PCT Pub. Date: Sep. 23, 2021

(65) Prior Publication Data
US 2023/0142602 A1 May 11, 2023

(30) Foreign Application Priority Data
Mar. 18, 2020 (JP) ................................. 2020-047222

(51) Int. Cl.
*H01M 10/052* (2010.01)
*H01M 4/36* (2006.01)
(Continued)

(52) U.S. Cl.
CPC ......... *H01M 10/052* (2013.01); *H01M 4/364* (2013.01); *H01M 4/505* (2013.01);
(Continued)

(58) Field of Classification Search
CPC ...... H01M 10/052; H01M 4/36; H01M 4/364; H01M 4/505; H01M 4/525; H01M 2004/027; H01M 2004/028
(Continued)

(56) References Cited

U.S. PATENT DOCUMENTS

2010/0209771 A1* 8/2010 Shizuka et al. ... H01M 10/0525
                                                      429/231.95
2016/0028072 A1   1/2016 Sakai et al.
2017/0133676 A1*  5/2017 Kodato et al. .... H01M 10/0525

FOREIGN PATENT DOCUMENTS

JP    2008-108649 A    5/2008
JP    2014-60029 A     4/2014
(Continued)

OTHER PUBLICATIONS

Machine translation of WO 2006118013 A1 (Year: 2006).*
(Continued)

*Primary Examiner* — Kevin P Kerns
(74) *Attorney, Agent, or Firm* — WHDA, LLP

(57) ABSTRACT

This nonaqueous electrolyte secondary battery has a nonaqueous electrolyte and an electrode assembly formed by layering a positive electrode and a negative electrode layered via a separator. The positive electrode has a positive electrode core and a positive electrode mix layer containing a positive electrode active substance. The median diameter (D50) of the positive electrode active substance in terms of volume is 5.0 to 7.0 μm, the BET specific surface area of the positive electrode active substance is 2.00 to 3.00 m²/g, the TAP density of the positive electrode active substance is 1.30 to 1.70 g/cm³, and the density of the positive electrode mix layer is 2.3 to 2.5 g/cm³.

4 Claims, 1 Drawing Sheet

(51) Int. Cl.
  H01M 4/505 (2010.01)
  H01M 4/525 (2010.01)
  H01M 4/02 (2006.01)

(52) U.S. Cl.
  CPC ...... H01M 4/525 (2013.01); *H01M 2004/027* (2013.01); *H01M 2004/028* (2013.01)

(58) Field of Classification Search
  USPC .......................................................... 429/209
  See application file for complete search history.

(56) References Cited

FOREIGN PATENT DOCUMENTS

| | | | | |
|---|---|---|---|---|
| JP | 2016-25041 | A | 2/2016 | |
| JP | 2018-106824 | A | 7/2018 | |
| JP | 2018-116840 | A | 7/2018 | |
| WO | WO 2006118013 A1 * | | 11/2006 | ............ H01M 4/505 |
| WO | 2009/031619 A1 | | 3/2009 | |
| WO | WO 2015083330 A1 * | | 6/2015 | ............ H01M 4/505 |

OTHER PUBLICATIONS

Machine translation of WO 2015083330 A1 (Year: 2015).*
International Search Report dated Apr. 20, 2021, issued in counterpart International Application No. PCT/JP2021/004631 (2 pages).

* cited by examiner

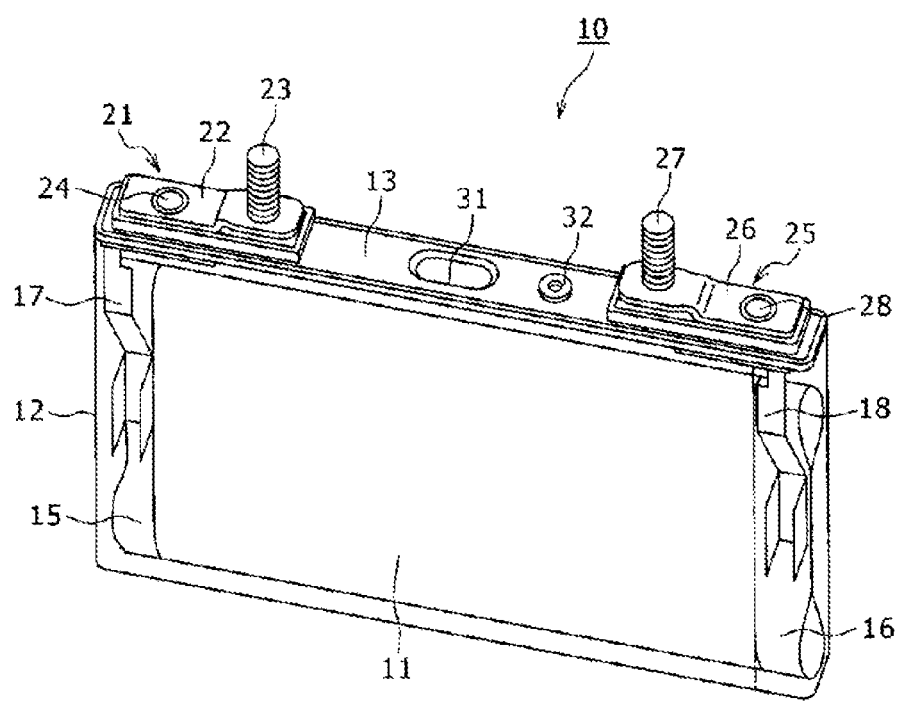

NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/004631 filed on Feb. 8, 2021 which claims the benefit of priority under 35 U.S.C. § 119 (a) of Japanese Patent Application No. 2020-047222 filed in Japan on Mar. 18, 2020, the contents of which are incorporated herein by reference.

TECHNICAL FIELD

The present disclosure relates to a non-aqueous electrolyte secondary battery.

BACKGROUND ART

Non-aqueous electrolyte secondary batteries have electrode assemblies in which positive electrodes and negative electrodes are alternately stacked with separators interposed therebetween, and non-aqueous electrolytes wherein the positive electrodes have positive electrode cores and positive electrode mixture layers including positive electrode active materials (for example, Patent Literature 1). The non-aqueous electrolyte secondary batteries are used as a power source for driving hybrid vehicles and electric vehicles, and are used in low- and normal-temperature environments.

In order to improve output characteristics of a non-aqueous electrolyte in low- and normal-temperature environments, it is necessary to increase a density of a positive electrode mixture layer to ensure a conductive pathway and reduce an internal resistance. Moreover, in order to improve the output characteristics particularly in the low-temperature environment, it is necessary to widen a specific surface area BET of a positive electrode active material, reducing a charge transfer resistance at an interface between the non-aqueous electrolyte and the positive electrode active material. In order to widen the specific surface area BET of the positive electrode active material, a particle size of the positive electrode active material is considered to be downsized.

CITATION LIST

Patent Literature

PATENT LITERATURE 1: Japanese Unexamined Patent Application Publication No. 2016-25041

SUMMARY

As described above, increasing the density of the positive electrode mixture layer and decreasing the particle size of the positive electrode active material lead to decreased pore size of the positive electrode mixture layer, resulting in reduced impregnability of the non-aqueous electrolyte. As a result, the non-aqueous electrolyte requires a long time to be impregnated into the positive electrode after poured upon production of a non-aqueous electrolyte secondary battery, resulting in lowering of production efficiency.

The non-aqueous electrolyte secondary battery that is one aspect of the present disclosure is a non-aqueous electrolyte secondary battery having an electrode assembly in which a positive electrode and a negative electrode are alternately stacked with a separator interposed therebetween, and a non-aqueous electrolyte, wherein the positive electrode has a positive electrode core and a positive electrode mixture layer including a positive electrode active material, wherein a volume-based median diameter (D50) of the positive electrode active material is 5.0 to 7.0 μm, a BET specific surface area of the positive electrode active material is 2.00 to 3.00 m$^2$/g, a TAP density of the positive electrode active material is 1.30 to 1.70 g/cm$^3$, and a density of the positive electrode mixture layer is 2.3 to 2.5 g/cm$^3$.

According to an aspect of the present disclosure, output characteristics in normal- and low-temperature environment as well as impregnability of the non-aqueous electrolyte upon pouring thereof can be improved.

BRIEF DESCRIPTION OF DRAWING

FIG. 1 is a perspective view of the non-aqueous electrolyte secondary battery according to an example of an embodiment.

DESCRIPTION OF EMBODIMENTS

Embodiments of the present disclosure will be described with reference to the drawings below. The shapes, materials, and numbers described below are exemplifications and can be changed as necessary according to the specifications of the non-aqueous electrolyte secondary battery. Hereinafter, equivalent elements are described with the same symbols in all drawings.

[Non-Aqueous Electrolyte Secondary Battery]

An example of the embodiment of the present disclosure will be described in detail below. In the present embodiment, a secondary battery 10 comprising a rectangular metal outer body 12 is illustrated as an example; however, the outer body is not limited to a rectangular shape, and may be, for example, a cylindrical shape, a coin shape or the like, and may be a battery case composed of a laminated sheet including a metal layer and a resin layer. Moreover, a wound-type electrode assembly 11 in which a positive electrode and a negative electrode are wound with a separator interposed therebetween is illustrated as an example, and it may be a stacked electrode assembly where a plurality of positive electrodes and a plurality of negative electrodes are alternately stacked on top of the other with separators interposed therebetween. Further, the case in which each mixture layer is formed on both sides of each core in both the positive electrode and the negative electrode is exemplified, but each mixture layer is not limited to the case where it is formed on both sides of each core, and may be formed on at least one surface thereof.

As shown in FIG. 1, secondary battery 10 comprises a wound-type electrode assembly 11 in which the positive electrode and negative electrode are wound with the separator interposed therebetween and formed into a flat shape with a flat portion and a pair of curved portions, an electrolyte, and outer body 12 that houses electrode assembly 11 and the electrolyte. Both outer body 12 and a sealing plate 13 are made of metal, for example, aluminum or an aluminum alloy.

Outer body 12 has a substantially rectangular in bottom view portion and a sidewall portion erected around the periphery of the bottom portion. The sidewall portion is formed perpendicular to the bottom portion. The dimensions of outer body 12 are not particularly limited, and for example, 60 to 160 mm in lateral direction. 60 to 100 mm in height, and a thickness of 10 to 40 mm.

The positive electrode is a long body having a positive electrode core made of metal and positive electrode mixture layers formed on both sides of the core, wherein a band-shaped positive electrode core exposed portion 15 with the positive electrode core exposed, is formed along the longitudinal direction at one end portion of the body in the short direction. Similarly, the negative electrode is a long body having a negative electrode core made of metal and a negative electrode mixture layers formed on both sides of the core, wherein a band-shaped negative electrode core exposed portion 16 with the negative electrode core exposed is formed along the longitudinal direction at one end portion of the body in the short direction. Electrode assembly 11 has a structure of the positive electrode and the negative electrode wound with the separator interposed therebetween with positive electrode core exposed portion 15 of the positive electrode arranged on one side in the axis direction, and with negative electrode core exposed portion 16 of the negative electrode arranged on the other side in the axis direction.

A positive electrode current collector 17 is connected to the stacked portion of the positive electrode core exposed portions 15 of the positive electrode, and a negative electrode current collector 18 is connected to the stacked portion of the negative electrode core exposed portions 16 of the negative electrode, respectively. Suitable positive electrode current collector 17 is made of aluminum or an aluminum alloy. Suitable negative electrode current collector 18 is made of copper or a copper alloy. A positive electrode terminal 21 has a positive electrode outer conductive portion 22 arranged on an outer side of the battery on a sealing plate 13, a positive electrode bolt portion 23 connected to positive electrode outer conductive portion 22, and a positive electrode inserting portion 24 to be inserted into a through-hole disposed on sealing plate 13, and it is electrically connected to positive electrode current collector 17. Moreover, a negative electrode terminal 25 has a negative electrode outer conductive portion 26 arranged on the outer side of the battery on sealing plate 13, a negative electrode bolt portion 27 connected to negative electrode outer conductive portion 26, and a negative electrode inserting portion 28 to be inserted into a through-hole disposed on sealing plate 13, and it is electrically connected to negative electrode current collector 18.

Positive electrode terminal 21 and positive electrode current collector 17 are fixed to sealing plate 13 via an inner side insulating member and an outer side insulating member, respectively. The inner side insulating member is arranged between sealing plate 13 and positive electrode current collector 17, and the outer side insulating member is arranged between sealing plate 13 and the positive electrode terminal 21. Similarly, negative electrode terminal 25 and negative electrode current collector 18 are fixed to sealing plate 13 via the inner side insulating member and the outer side insulating member, respectively. The inner side insulating member is arranged between sealing plate 13 and negative electrode current collector 18, and the outer side insulating member is arranged between sealing plate 13 and negative electrode terminal 25.

Electrode assembly 11 is housed in outer body 12. Sealing plate 13 is connected to an opening edge of outer body 12 by laser welding or the like. Sealing plate 13 has an electrolyte pouring hole 32, and electrolyte pouring hole 32 is sealed with a sealing plug after the electrolyte is poured into outer body 12. Sealing plate 13 has a gas discharge valve 31 for discharging gas when a pressure inside the battery is not less than a predetermined value.

Hereinafter, the positive electrode, negative electrode, and the separator, constituting electrode assembly 11, will be described in detail, and in particular the positive electrode mixture layer and the positive electrode active material, constituting the positive electrode will be described in detail.

[Positive Electrode]

The positive electrode has a positive electrode core and a positive electrode mixture layer formed on a surface of the positive electrode core. As the positive electrode core, a foil of a metal such as aluminum or an aluminum alloy that is stable in the potential range of the positive electrode, or a film or the like in which the metal is arranged on the surface layer, can be used. The thickness of positive electrode core is, for example, 10 μm to 20 μm. The thickness of the positive electrode mixture layer is, for example, 10 μm to 150 μm on one side of the positive electrode core. The positive electrode can be fabricated by coating the surface of positive electrode core with a positive electrode mixture slurry including the positive electrode active material, a conductive agent, a binder, etc., drying the coating film, and then compressing it.

The conductive agent included in the positive electrode mixture layer that is carbon materials such as carbon black, acetylene black, Ketjen black, carbon nanotubes, and graphite, can be exemplified. As the binder included in the positive electrode mixture layer, fluororesins such as polytetrafluoroethylene (PTFE) and polyvinylidene difluoride (PVdF), polyacrylonitrile (PAN), polyimides, acrylic resins, polyolefins, etc., can be exemplified. These resins may be combined with carboxymethyl cellulose (CMC) or a salt thereof, polyethylene oxide (PEO), or the like.

[Active Material]

The positive electrode active material is a metal oxide including at least lithium and a transition metal element, and the transition metal element is for example, Mn, Ni, and Co, etc. The additive element of the lithium-containing transition metal oxide is not limited to Mn, Ni, and Co, and may include other additive elements. Other additive elements include, for example, alkali metal elements other than lithium, transition metal elements other than Mn, Ni, and Co, alkaline earth metal elements, Group 12 elements, Group 13 elements, and Group 14 elements. Examples of the other additive elements include Zr, B, Mg, Al, Ti. Fe, Cu, Zn, Sn, Na. K, Ba, Sr, Ca, etc. Among them, Zr is suitable.

Including Zr stabilizes the crystal structure of the lithium-containing transition metal oxide, which is considered to improve the durability at elevated temperatures and the cycle characteristics of the positive electrode mixture layer. A content of Zr in the lithium-containing transition metal oxide is preferably 0.05 mol % or more and 10.00 mol % or less, more preferably 0.10 mol % or more and 5.00 mol % or less, and particularly preferably 0.20 mol % or more and 3.00 mol % or less, relative to the total amount of metals excluding Li.

The positive electrode active material is a lithium metal composite oxide including, for example, at least one element selected from Ni, Co, and Mn. The lithium metal composite oxide is represented by formula $Li_{1+x}Ni_aMn_bCo_cO_2$, and preferably satisfies the conditions that $a+b+c=1$, $0<x\leq 0.3$, $a\geq b, a\geq c, 0<c/(a+b)<0.65$, and $1.0\leq a/b\leq 3.0$.

The volume-based median diameter (D50) of the positive electrode active material is preferably 5.0 to 7.0 μm and more preferably 6.0 to 7.0 μm. The median diameter (D50) is a particle size at which the cumulative volume value reaches 50% in the particle size distribution measured by a laser diffraction scattering method, and is also called a 50% particle size or medium diameter. The D50 of positive electrode active material is measured by a laser diffraction particle size analyzer (SALD-2200 manufactured by Shimazu Corporation). Moreover, the BET specific surface area of the positive electrode active material is preferably 2.00 to 3.00 m$^2$/g and more preferably 2.20 to 2.40 m$^2$/g.

From the above, a reaction area of the positive electrode active material is widened and a charge transfer resistance at the interface between the positive electrode active material and the electrolyte is lowered, enabling the output characteristics of secondary battery 10 in a low-temperature environment to be improved.

A TAP density of the positive electrode active material is preferably 1.30 to 1.70 g % cm$^3$ and more preferably 1.60 to 1.70 g/cm$^3$. TAP density is a bulk density measured by vibrating the powder upon filling the container to render it more filled. The TAP density can be measured by using a powder reduction measuring instrument (TPM-1 manufactured by Tsutsui Scientific Instruments Co. Ltd.). Specifically, 50 g of a sample (powder) is placed in a glass graduated cylinder of 150 ml, and the cylinder is tapped 1.000 times with a stroke of 30 mm by using the powder reduction measuring instrument to enable the density as a TAP density to be determined. Moreover, the density of the positive electrode mixture layer is preferably 2.3 to 2.5 g/cm$^3$ and more preferably 2.4 g/cm$^3$. This ensures a conductive pathway in the positive electrode and reduces an internal resistance, thereby enabling the output characteristics of secondary battery 10 to be improved.

For example, when a density of the positive electrode mixture layer is increased in order to improve the output characteristics in low- and normal-temperature environments, and the particle size of the positive electrode active material is decreased in order to increase the specific surface area BET of the positive electrode active material for improving the output characteristics in a low-temperature environment, the pore diameter of the positive electrode mixture layer becomes smaller, lowering the impregnability of the non-aqueous electrolyte. However, in the present embodiment, the D50 particle size and TAP density of the positive electrode active material, set to appropriate values do not cause an adverse effect of the smaller pore diameter of the positive electrode mixture layer.

In the present embodiment, the volume-based median pore diameter of the positive electrode mixture layer is preferably 0.5 to 0.7 μm and more preferably 0.6 to 0.7 μm. The median pore diameter is a volume-based median pore diameter measured by a mercury injection method, which can be measured by using an automatic mercury porosimeter (AutoPore V9620 manufactured by Shimadzu Corporation-Micromeritics Instruments Corporation). This avoids lowering in impregnation of the non-aqueous electrolyte.

The positive electrode active material of the present embodiment is produced as follows. First, a Ni source composed of a nickel compound, a Co source composed of a cobalt compound, and a Mn source composed of a manganese compound are charged in a solvent to prepare a solution dissolving them. To the aforementioned solution is added an appropriate amount of alkali under appropriate mixing conditions to obtain a precipitate. Then, the precipitate is washed with water, dehydrated, and dried to produce a precursor of lithium nickel cobalt manganese composite oxide (hereinafter referred to as NCM precursor). This precursor and a Li raw material are mixed in appropriate amounts, calcined, and crashed under appropriate conditions to produce a positive electrode active material with the particle size described above. The D50, BET specific surface area, and TAP density of the positive electrode active material and the density and median pore diameter of the positive electrode mixture layer, etc., of the present embodiment, can be adjusted to desired ranges by changing the aforementioned crystallization conditions and aforementioned calcination conditions.

[Negative Electrode]

The negative electrode has a negative electrode core and a negative electrode mixture layers formed on both sides of the negative electrode core. As the negative electrode core, a foil of a metal such as copper or a copper alloy that is stable in the potential range of the negative electrode, or a film or the like in which the metal is arranged on the surface layer, can be used. The negative electrode mixture layer includes a negative electrode active material and a binder. The thickness of negative electrode mixture layer is, for example, 10 μm to 150 μm on one side of the negative electrode core. The negative electrode can be fabricated by coating a surface of the negative electrode core with the negative electrode mixture slurry including the negative electrode active material, the binder, etc., drying the coating film, and then rolling it to form the negative electrode mixture layers on both sides of the negative electrode core.

The negative electrode active material included in the negative electrode mixture layer is not particularly limited provided that it can reversibly intercalate and deintercalate lithium ions, and a carbon material such as graphite is generally used. The graphite may be any of natural graphite such as scaly graphite, massive graphite and earthy graphite, and artificial graphite such as massive artificial graphite and graphitized mesophase carbon microbeads. Moreover, as the negative electrode active material, a metal such as Si or Sn that alloys with Li, a metal compound including Si, Sn or the like, a lithium titanium composite oxide, or the like may be used. Further the negative electrode active material on which a carbon film is disposed may be used. For example, a Si-containing compound represented by SiO$_x$(0.5≤x≤1.6), a Si-containing compound in which Si fine particles are dispersed in a lithium silicate phase represented by Li$_{2y}$SiO$_{(2+y)}$ (0<y<2), or the like can be combined with graphite.

As the binder included in the negative electrode mixture layer, a fluororesin such as PTFE or PVdF, a PAN, a polyimide, an acrylic resin, a polyolefin or the like may be used as in the case of the positive electrode, however, styrene-butadiene rubber (SBR) is preferably used. Moreover, the negative electrode mixture layer may include CMC or a salt thereof, polyacrylic acid (PAA) or a salt thereof, polyvinyl alcohol (PVA), etc.

[Separator]

A separator to be used is, for example, a porous sheet having ion permeability and insulating properties. Specific examples of the porous sheet include a microporous thin membrane, a woven fabric, and a non-woven fabric. As a material of the separator, a polyolefin such as polyethylene or polypropylene, cellulose, or the like is suitable. The separator may have a single-layer structure or a multilayer structure. Fiurther, a resin layer having high heat resistance, such as an aramid resin, and a filler layer including a filler of an inorganic compound, may be disposed on a surface of the separator.

[Non-Aqueous Electrolyte]

The non-aqueous electrolyte includes a non-aqueous solvent and an electrolyte salt dissolved in the non-aqueous solvent. As the non-aqueous solvent, for example, an ester, an ether, a nitrile such as acetonitrile, an amide such as dimethylformamide, or a mixed solvent of two or more of them can be used. The non-aqueous solvent may include a halogen-substituted derivative in which at least a portion of hydrogen in the solvent is substituted with a halogen atom such as fluorine. The halogen-substituted derivative includes, for example, a fluorinated cyclic carbonate such as fluoroethylene carbonate (FEC), a fluorinated chain carbonate, and a fluorinated chain carboxylic acid ester such as fluorine methyl propionate (FMP).

Examples of the aforementioned esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methylpropyl carbonate, ethylpropyl carbonate, and methylisopropylcarbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP) and ethyl propionate (EP).

Examples of the aforementioned ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The electrolyte salt is preferably a lithium salt. Examples of lithium salts include borates such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$. $LiPF_{6-x}(C_nF_{2n+1})_x$ (1<x<6, n is 1 or 2), $LiB_{10}Cl_{10}$, LiCl, LiBr, LiI, lithium chloroborane, lithium lower aliphatic carboxylate, $Li_2B_4O_7$, $Li(B(C_2O_4)F_2)$, and imide salts such as $LiN(SO_2CF_3)_2$ and $LiN(CiF_{2l+1}SO_2)(C_mF_{2m+1}SO_2)$ wherein l and m are integers of 0 or more. The lithium salt may be used alone, or a plurality of types may be mixed and used. Among them. $LiPF_6$ is preferably used from the viewpoint of ionic conductivity, electrochemical stability, etc. The concentration of the lithium salt is, for example, 0.8 mol to 1.8 mol per 1 L of the non-aqueous solvent. Moreover, vinylene carbonate or propanesultone-based additives may be added.

The present invention is not limited to the aforementioned embodiments and variations thereof, and various changes and modifications are of course possible within the scope of the items described in the claims of the present application.

EXAMPLES

The present disclosure will be further described below with reference to Examples, but the present disclosure is not limited to the following Examples.

Example 1

[Fabrication of Positive Electrode Active Material]

To a Ni source composed of a nickel compound, a Co source composed of a cobalt compound, and a Mn source composed of a manganese compound, was added a solvent to prepare a solution dissolving each raw material. To the solution was added an appropriate amount of alkali under appropriate mixing conditions to obtain a precipitate. Then, it was washed with water, dehydrated, and dried, to fabricate a NCM precursor. The NCM precursor and a Li material were mixed in appropriate amounts, calcined, and crushed under appropriate conditions to produce a positive electrode active material with a median diameter (D50) of 5.9 μm.

[Fabrication of Positive Electrode Plate]

A lithium nickel cobalt manganese composite oxide represented by $LiNi_{0.35}Co_{0.35}Mn_{0.30}O_2$ as a positive electrode active material, carbon powder as a conductive agent, and polyvinylidene difluoride (PVdF) as a binder were mixed with N-methyl-2-pyrrolidone (NMP) as a dispersion medium to prepare a positive electrode mixture slurry. Here, the mass ratio of the positive electrode active material, conductive agent, and binder in the positive electrode mixture slurry was 90:7:3.

Both sides of an aluminum foil having a thickness of 15 In as the positive electrode core are coated with the positive electrode mixture slurry prepared by the aforementioned method using a die coater. Thereafter the positive electrode mixture slurry was dried to remove NMP as the dispersion medium. The positive electrode active material mixture layer was compressed by a pair of compressing rollers. Then it was cut into a predetermined size so that a positive electrode core exposed portion on both sides of which the positive electrode active material mixture layers had not been formed, was formed at one end portion of a positive electrode plate, to obtain a positive electrode plate.

[Fabrication of Negative Electrode Plate]

Graphite powder as a negative electrode active material, carboxymethyl cellulose (CMC) as a thickener, and styrene-butadiene rubber (SBR) as a binder were dispersed in water at the proportion of 99.2:0.6:0.2 by mass, respectively to prepare a negative electrode mixture slurry.

Both sides of a copper foil having a thickness of 8 μm as a negative electrode core were coated with the negative electrode mixture slurry prepared by the aforementioned method using a die coater. Next the negative electrode mixture slurry was dried to remove water as a dispersion medium, then compressed by roll pressing so as to be a predetermined thickness. Then it was cut into a predetermined size so that a negative electrode core exposed portion on both sides of which the negative electrode active material mixture layers had not been formed was formed at both end portions of the negative electrode plate in the width direction, to obtain a negative electrode plate.

[Preparation of Non-Aqueous Electrolytic Solution]

Ethylene carbonate (EC), ethyl methyl carbonate (EMC), dimethyl carbonate (DMC), and methylene propionate (MP) were mixed to a volume ratio of 25:37:35:3 (25° C., 1 atm) to prepare a mixed solvent. To this mixed solvent was added $LiPF_6$ as a solute to achieve a concentration of 1.15 mol/L. and further added lithium fluorosulfonate at a concentration of 1% by mass relative to the non-aqueous electrolytic solution to obtain a non-aqueous electrolytic solution.

[Fabrication of Battery]

The electrode assembly in which the positive electrode plate and the negative electrode plate were wound with the separator interposed therebetween was housed in an outer body composed of an aluminum laminated film, and an electrolytic solution was poured thereto followed by sealed to fabricate a non-aqueous electrolyte secondary battery with a design capacity of 0.14 Ah.

[Particle Size Distribution Measurement of Positive Electrode Active Material]

A particle size distribution was measured by a laser diffraction/scattering method (SALD-2200 manufactured by SHIMADZU Corporation).

[Measurement of Specific Surface Area BET of Positive Electrode Active Material]

A specific surface area was measured by the BET one-point method (Macsorb manufactured by Mountech Co., Ltd.).

[Measurement of TAP Density of Positive Electrode Active Material]

50 g of a sample (positive electrode active material powder) was charged in a glass graduated cylinder of 150 cm$^3$, and a powder filling density when the cylinder was tapped 1000 times with a stroke of 30 mm by using a powder reduction measuring instrument, was obtained and determined as a TAP density.

[Measurement of Median Pore Diameter]

A median pore diameter was measured by the mercury injection method using an automatic mercury porosimeter (AutoPore V9620 manufactured by Shimadzu Corporation-Micromeritics Instruments Corporation).

[Density of Positive Electrode Mixture Layer]

A measurement piece of 10 cm$^2$ was cut from the positive electrode plate, the thickness and mass of the measurement piece were measured, and the density of the positive electrode mixture layer was calculated from the thickness, area, and mass of the positive electrode mixture layer, from which the thickness and mass of the positive electrode core were subtracted.

[Measurement of Output Characteristics in Normal-Temperature Environment]

CCCV charge was carried out for a non-aqueous electrolyte secondary battery with a charging current of ¹/₁₀ It under an environment of 25° C. until the depth of charge (SOC) reached 50%. Then, the non-aqueous electrolyte secondary battery was left undisturbed for 2 hours under an environment of 25° C. Thereafter, it was discharged for 10 seconds under an environment of 25° C. with each current of 1 It, 2 It, 4 It, 8 It, 10 It, 12 It, and 16 It, and each battery voltage was measured. Each current value was plotted against the corresponding battery voltage, and the output (W) was calculated from the I-V characteristics upon discharge and used as the normal-temperature output characteristics. It is noted that the depth of charge shifted by discharge was restored to an original depth of charge by charging with a constant current of 1 It.

[Measurement of Output Characteristics in Low-Temperature Environment]

CCCV charge was carried out for a non-aqueous electrolyte secondary battery with a charging current of ¹/₁₀ It under an environment of 25° C. until the depth of charge (SOC) reached 50%. Then, the non-aqueous electrolyte secondary battery was left undisturbed for 2 hours under an environment of −30° C. Thereafter, it was discharged for 10 seconds under an environment of −30° C. with each current of 1 It, 2.4 It, 3.6 It, 4.8 It, 6.0 It, 7.2 It, and 8.4 It, and each battery voltage was measured. Each current value was plotted against the corresponding battery voltage, and the output (W) was calculated from the I-V characteristics upon discharge and used as the low-temperature output characteristics. It is noted that the depth of charge shifted by discharge was restored to an original depth of charge by charging with a constant current of 0.2 It.

[Measurement of Impregnation Time]

After propylene carbonate was dropped onto the surface of the positive electrode plate with a micropipette of 1 cm$^3$, the time until the droplets were impregnated was measured as an impregnation time.

Example 2

The battery was fabricated in the same manner as in Example 1 except that the crystallization conditions and calcination conditions were changed so that the D50, BET specific surface area, TAP density of the positive electrode active material, and the density and the median pore diameter of the positive electrode mixture layer were obtained as shown in Table 1, under the conditions for the fabrication of the positive electrode active material.

Comparative Examples 1 to 13

Each battery was fabricated in the same manner as in Example 1 except that the crystallization conditions and calcination conditions were controlled so that the D50, BET specific surface area, TAP density of the positive electrode active material, and the density and the median pore diameter of the positive electrode mixture layer were obtained as shown in Table 1, under the conditions for the fabrication of the positive electrode active material.

TABLE 1

| | Particle size of positive electrode active material (D50)/μm | BET of positive electrode active material (m$^2$/g) | TAP density of positive electrode active material (g/cm$^3$) | Density of positive electrode mixture layer (g/cm$^3$) | Median pore diameter (μm) | Normal-temperature discharge resistance (10 s) | Low-temperature discharge resistance (10 s) | Impregnation time (sec) |
|---|---|---|---|---|---|---|---|---|
| Example 1 | 5.9 | 2.26 | 1.68 | 2.4 | 0.5 | 100% | 100% | 100% |
| Example 2 | 7.0 | 2.25 | 1.70 | 2.4 | 0.6 | 99% | 100% | 70% |
| Comparative Example 1 | 4.2 | 2.26 | 1.55 | 2.0 | 0.8 | 133% | 105% | 34% |
| Comparative Example 2 | 5.9 | 2.26 | 1.68 | 2.0 | 1.0 | 134% | 105% | 17% |
| Comparative Example 3 | 7.0 | 2.25 | 1.70 | 2.0 | 1.1 | 135% | 105% | 12% |
| Comparative Example 4 | 4.2 | 2.26 | 1.55 | 2.4 | 0.2 | 103% | 100% | 290% |
| Comparative Example 5 | 4.2 | 2.26 | 1.68 | 2.8 | 0.1 | 214% | 101% | 414% |
| Comparative Example 6 | 5.9 | 2.26 | 1.68 | 2.8 | 0.3 | 210% | 101% | 204% |
| Comparative Example 7 | 7.0 | 2.25 | 1.70 | 2.8 | 0.4 | 208% | 101% | 143% |
| Comparative Example 8 | 3.0 | 1.26 | 1.67 | 2.0 | 0.8 | 135% | 133% | 34% |
| Comparative Example 9 | 7.5 | 0.30 | 2.34 | 2.0 | 1.1 | 160% | 184% | 12% |
| Comparative Example 10 | 3.0 | 1.26 | 1.53 | 2.4 | 0.2 | 129% | 133% | 290% |
| Comparative Example 11 | 7.5 | 0.37 | 2.34 | 2.4 | 0.6 | 152% | 184% | 70% |
| Comparative Example 12 | 3.0 | 1.26 | 1.53 | 2.8 | 0.1 | 138% | 127% | 414% |
| Comparative Example 13 | 7.5 | 0.37 | 2.34 | 2.8 | 0.4 | 224% | 175% | 143% |

Examples

In the non-aqueous electrolyte secondary batteries of Examples 1 and 2, the BET specific surface area of the positive electrode active material was 2.00 to 3.00 m?/g, indicating that the reaction area of the positive electrode active material was widened, and the charge transfer resistance upon low-temperature discharge was lowered, thereby improving the output characteristics in the low-temperature environment. Moreover, the TAP density of the positive electrode active material was 1.30 to 1.70 g/cm$^3$ and the density of the positive electrode mixture layer was 2.3 to 2.5 g/cm$^3$, indicating that the conductive pathway of the positive electrode was secured and the internal resistance was lowered, resulting in improvement on output characteristics in the normal-temperature environment. Furthermore, the particle size of the positive electrode active material being 5.0 to 7.0 μm and the density of the positive electrode mixture layer being 2.3 to 2.5 g/cm$^3$, resulted in the median pore diameter of the positive electrode mixture layer of 0.5 to 0.7 μm, which enabled the impregnation time upon pouring the non-aqueous electrolytic solution to be shortened.

Comparative Examples

The non-aqueous electrolyte secondary batteries of Comparative Examples 1 to 3 have larger normal-temperature discharge resistance. This is conjectured because the particle size was 5.0 to 7.0 μm and the BET specific surface area was 2.00 to 3.00 m/g; however, the density of the positive electrode mixture layer was about 2.0 g/cm$^3$, resulting in that the conductive pathway of the positive electrode mixture layer was not sufficiently secured, and the internal resistance became larger.

In the non-aqueous electrolyte secondary battery of Comparative Example 4, the impregnation time upon pouring is longer. This is due to the smaller pore diameter of the positive electrode mixture layer because the particle size was about 4.0 μm.

In the non-aqueous electrolyte secondary batteries of Comparative Examples 5 to 7 each, the impregnation time upon pouring becomes longer. This is conjectured because the density of the positive electrode mixture layer was approximately 2.8 g/cm$^3$, rendering the pore diameter smaller.

In the non-aqueous electrolyte secondary batteries of Comparative Examples 8 to 13 each, the low-temperature discharge resistance is larger. This is conjectured because the BET specific surface area of the positive electrode active material is small, and the charge transfer resistance at the interface between the non-aqueous electrolytic solution and the positive electrode active material is large.

REFERENCE SIGNS LIST 10 non-aqueous electrolyte secondary battery
11 electrode assembly
12 outer body
13 sealing plate
15 positive electrode core exposed portion
16 negative electrode core exposed portion
17 positive electrode current collector
18 negative electrode current collector
21 positive electrode terminal
22 positive electrode outer conductive portion
23 positive electrode bolt portion
24 positive electrode inserting portion
25 negative electrode terminal
26 negative electrode outer conductive portion
27 negative electrode bolt portion
28 negative electrode inserting portion
31 electrolyte pouring hole
32 gas discharge valve

The invention claimed is:

1. A non-aqueous electrolyte secondary battery, having:
an electrode assembly in which a positive electrode and a negative electrode are alternately stacked with a separator interposed therebetween; and
a non-aqueous electrolyte, wherein
the positive electrode has a positive electrode core and a positive electrode mixture layer including a positive electrode active material, wherein
a volume-based median diameter (D50) of the positive electrode active material is 5.0 to 7.0 μm,
a BET specific surface area of the positive electrode active material is 2.00 to 3.00 m$^2$/g,
a TAP density of the positive electrode active material is 1.30 to 1.70 g/cm$^3$, and
a density of the positive electrode mixture layer is 2.3 to 2.5 g/cm$^3$.

2. The non-aqueous electrolyte secondary battery according to claim 1, wherein a median pore diameter of the positive electrode mixture layer is 0.5 to 0.7 μm.

3. The non-aqueous electrolyte secondary battery according to claim 2, wherein the positive electrode active material is a lithium metal composite oxide represented by a formula $Li_{1+x}Ni_aMn_bCo_cO_2$ wherein $a+b+c=1$, $0<x\leq0.3$, $a\geq b$, $a\geq c$, $0<c/(a+b)<0.65$, and $1.0\leq a/b\leq3.0$.

4. The non-aqueous electrolyte secondary battery according to claim 1, wherein the positive electrode active material is a lithium metal composite oxide represented by a formula $Li_{1+x}Ni_aMn_bCo_cO_2$ wherein $a+b+c=1$, $0<x\leq0.3$, $a\geq b$, $a\geq c$, $0<c/(a+b)<0.65$, and $1.0\leq a/b\leq3.0$.

* * * * *